(12) United States Patent
Gao et al.

(10) Patent No.: US 11,809,164 B2
(45) Date of Patent: Nov. 7, 2023

(54) INTEGRATING MACHINE LEARNING INTO CONTROL SYSTEMS FOR INDUSTRIAL FACILITIES

(71) Applicant: Google LLC, Mountain View, CA (US)

(72) Inventors: Jim Gao, Menlo Park, CA (US); Christopher Gamble, London (GB); Amanda Gasparik, Philadelphia, PA (US); Vedavyas Panneershelvam, London (GB); David Barker, Reading (GB); Dustin Reishus, Mountain View, CA (US); Abigail Ward, Mountain View, CA (US); Jerry Luo, Mountain View, CA (US); Brian Kim, Sunnyvale, CA (US); Mark Schwabacher, Santa Clara, CA (US); Stephen Webster, San Mateo, CA (US); Timothy Jason Kieper, Beacon, NY (US); Daniel Fuenffinger, Bellevue, NE (US); Zakerey Bennett, London (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/681,652

(22) Filed: Feb. 25, 2022

(65) Prior Publication Data

US 2022/0179401 A1 Jun. 9, 2022

Related U.S. Application Data

(63) Continuation of application No. 16/654,978, filed on Oct. 16, 2019, now abandoned, which is a
(Continued)

(51) Int. Cl.
*H02J 3/46* (2006.01)
*G06Q 10/04* (2023.01)
(Continued)

(52) U.S. Cl.
CPC ......... *G05B 19/4155* (2013.01); *G06N 20/00* (2019.01); *G05B 2219/40499* (2013.01)

(58) Field of Classification Search
CPC ...... G05B 19/4155; G05B 2219/40499; G06N 20/00; G06Q 10/0635
See application file for complete search history.

(56) References Cited

U.S. PATENT DOCUMENTS 8,346,398 B2  1/2013  Ahmed et al.
9,729,639 B2  8/2017  Sustaeta et al.
(Continued)

FOREIGN PATENT DOCUMENTS

CN  101470421 A  7/2009
CN  101500633 A  8/2009
(Continued)

OTHER PUBLICATIONS

CN Office Action in Chinese Appln. No. 201880013978.8, dated Oct. 11, 2022, 19 pages (with English Translation).
(Continued)

*Primary Examiner* — Brandon S Cole
(74) *Attorney, Agent, or Firm* — Fish & Richardson P.C.

(57) ABSTRACT

Methods, systems, apparatus and computer program products for implementing machine learning within control systems are disclosed. An industrial facility setting slate can be received from a machine learning system and a determination can be made as to whether to adopt the settings in the industrial facility setting slate. The machine learning model can be a neural network, e.g., a deep neural network, that has been trained, e.g., using reinforcement learning to predict a data setting slate that is predicted to optimize an efficiency of a data center.

20 Claims, 3 Drawing Sheets

Related U.S. Application Data continuation of application No. PCT/US2018/029611, filed on Apr. 26, 2018.

(60) Provisional application No. 62/490,544, filed on Apr. 26, 2017.

(51) Int. Cl.
  *G06Q 10/10* (2023.01)
  *G05B 19/4155* (2006.01)
  *G06N 20/00* (2019.01)

(56) References Cited

U.S. PATENT DOCUMENTS

| | | | |
|---|---|---|---|
| 2004/0267679 A1* | 12/2004 | Fromherz | G06N 5/01 706/19 |
| 2005/0043922 A1 | 2/2005 | Weidl et al. | |
| 2008/0177994 A1* | 7/2008 | Mayer | G06F 16/00 709/224 |
| 2009/0204245 A1 | 8/2009 | Sustaeta et al. | |
| 2009/0204267 A1 | 8/2009 | Sustaeta et al. | |
| 2010/0076607 A1 | 3/2010 | Ahmed et al. | |
| 2012/0197828 A1 | 8/2012 | Yi | |
| 2013/0169309 A1* | 7/2013 | Bickel | H02J 3/241 324/764.01 |
| 2013/0191185 A1* | 7/2013 | Galvin | G06Q 10/10 705/7.36 |
| 2014/0149477 A1 | 5/2014 | Abramovitz et al. | |
| 2015/0315008 A1* | 11/2015 | Locke | B67D 1/0857 222/52 |
| 2015/0317449 A1* | 11/2015 | Eder | A61B 5/1118 600/595 |
| 2015/0339765 A1* | 11/2015 | Dubey | G06Q 40/00 705/35 |
| 2016/0058933 A1* | 3/2016 | Ballantyne | G16H 20/40 210/85 |
| 2016/0163186 A1* | 6/2016 | Davidson | G06Q 50/06 340/506 |
| 2016/0281607 A1 | 9/2016 | Asati et al. | |
| 2016/0337441 A1 | 11/2016 | Bloomquist | |
| 2017/0006135 A1 | 1/2017 | Siebel | |
| 2017/0024643 A1 | 2/2017 | Lillicrap et al. | |
| 2017/0220974 A1* | 8/2017 | Wang | G06Q 10/063116 |
| 2017/0351241 A1 | 12/2017 | Bowers | |

FOREIGN PATENT DOCUMENTS

| | | |
|---|---|---|
| CN | 102184746 A | 9/2011 |
| CN | 102620378 A | 8/2012 |
| CN | 105160397 A | 12/2015 |
| CN | 106056213 A | 10/2016 |
| TW | 201533396 | 9/2015 |

OTHER PUBLICATIONS

Bertsekas et al, "Neuro-dynamic programming: an overview," Proceedings of the 34th Conference on Decision & Control, Dec. 1995, 5 pages.

PCT International Search Report and Written Opinion in International Appln No. PCT/US2018/029611, dated Jul. 18, 2018.

PCT International Preliminary Report on Patentability in International Appln. No. PCT/US2018/029611, dated Nov. 7, 2019, 11 pages.

PCT Written Opinion in International Appln No. PCT/US2018/029611, dated Apr. 17, 2019, 9 pages.

TW Office Action in Taiwanese Appln No. 107114323, dated Jul. 29, 2019, 11 pages (with English translation).

U.S. Appl. No. 15/410,547, Evans et al, Optimizing Data Center Controls Using Neural Networks, filed Jan. 19, 2017, 46 pages.

Office Action in Chinese Appln. No. 201880013978.8, dated Apr. 28, 2023, 20 pages (with English Translation).

Zhang et al., "Kriging Prediction Method for End Issue of Empirical Mode Decomposition," Journal of Vibration, Measurement & Diagnosis, Dec. 2021, 6 pages (with English Abstract).

\* cited by examiner

INTEGRATING MACHINE LEARNING INTO CONTROL SYSTEMS FOR INDUSTRIAL FACILITIES

CROSS-REFERENCE TO RELATED APPLICATIONS

This application is a continuation of U.S. application Ser. No. 16/654,978, for INTEGRATING MACHINE LEARNING INTO CONTROL SYSTEMS FOR INDUSTRIAL FACILITIES, filed on Oct. 16, 2019, which is a continuation of Patent Cooperation Treaty Application No. PCT/US2018/029611, for INTEGRATING MACHINE LEARNING INTO CONTROL SYSTEMS, filed on Apr. 26, 2018, which claims the benefit of the filing date of U.S. Provisional Application No. 62/490,544 for INTEGRATING MACHINE LEARNING INTO CONTROL SYSTEMS, filed on Apr. 26, 2017. The disclosure of the foregoing applications are incorporated here by reference.

BACKGROUND

This specification relates to integrating machine learning into control systems.

A machine learning model receives input and generates output based on its received input and on values of model parameters.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Neural networks can be trained using reinforcement learning to generate predicted outputs. Generally, in a reinforcement learning training technique, a reward is received and is used to adjust the values of the parameters of the neural network.

For example, a neural network trained using reinforcement learning can propose settings for an industrial facility, such as data center, which is a facility that holds computer servers for remote storage, processing, or distribution of large amounts of data.

SUMMARY

This specification describes technologies for machine learning systems in general, and specifically to systems and methods for directly controlling physical infrastructure of industrial facilities using a machine learning system.

In general, one innovative aspect of the subject matter described in this specification can be embodied in a method that uses machine learning to control physical infrastructure of industrial facilities.

Other embodiments of this aspect include corresponding computer systems, apparatus, and computer programs recorded on one or more computer storage devices, each configured to perform the actions of the methods. For a system of one or more computers to be configured to perform particular operations means that the system has installed on it software, firmware, hardware, or a combination of them that in operation cause the system to perform the operations or actions. For one or more computer programs to be configured to perform particular operations or action means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

An example method that includes receiving, from a machine learning system, an industrial facility setting slate that the machine learning system predicts will optimize an efficiency of an industrial facility, wherein the industrial facility settings slate defines a respective setting for each of a plurality of industrial facility controls; determining whether the industrial facility settings defined by the industrial facility setting slate can safely be adopted by the industrial facility (e.g., whether the industrial facility will, if the settings predicted by a prediction model are adopted, operate in accordance with pre-determined criteria that determine a safe environment for the industrial facility); and in response to determining that the industrial facility settings defined by the industrial facility setting slate can safely be adopted, adopting the industrial facility settings defined by the industrial facility setting slate.

Here the term "optimize" is used to mean improving the efficiency of the industrial facility with respect to an efficiency criterion. "Optimization of efficiency" does not necessarily imply that the settings defined by the industrial facility setting slate are the settings which provide the absolute maximum of efficiency with respect to all possible values of the settings, but rather the term may mean that the efficiency according to the efficiency criterion is greater for the industrial facility setting slate than for at least one other possible industrial facility setting slate. In particular, the term "optimization of efficiency" may mean that the industrial facility setting slate provides an efficiency according to the efficiency criterion which is no less than respective efficiencies which have been derived for a plurality of other possible industrial facility setting slates.

The term "industrial facility" may be defined as a physical entity ("physical infrastructure") comprising one of more physical units (e.g., machinery, computer equipment or other equipment) arranged to act on (e.g., to generate, modify or rearrange) any one or more of: (i) data, (ii) at least one communication signal, (iii) at least one power signal and/or (iv) a plurality of physical elements. The industrial facility may be for producing data/signals/physical elements for a large number (e.g., at least 100, and typically many thousands) of individuals, who typically do not have ownership of the industrial facility. The industrial facility controls may comprise control parameters which modify the physical operation of the physical units and/or control parameters for modifying the operation of additional equipment (e.g., cooling equipment) which is used to maintain the operating state of the physical units. The physical units may be located in one geographical location (e.g., within one building) but may alternatively be geographically distributed. The "industrial facility" may for example be a data center, and the physical unit(s) may comprise server(s) for processing data received by the data center to generate, from the received data, modified data which is transmitted from the data center. Alternatively, the "industrial facility" may be a manufacturing or distribution center, and the physical unit(s) may comprise apparatus which acts on physical elements to modify them, and/or to assemble them, and/or to distribute them to locations outside the industrial facility. Alternatively, the "industrial facility" may be a station for generating a tele-communication signal (e.g., which is broadcast or multi-cast), or a power generation facility for generating a power signal, or a laboratory where physical elements are examined and/or modified to produce data.

A second embodiment may be a controller that performs the respective operations of the example method.

The second embodiment may be expressed as a system comprising:
  one or more computers; and
  one or more storage devices storing instructions that are operable, when executed on one or more computers, to cause the one or more computers to perform the operations of:
    receiving, from a machine learning system, an industrial facility setting slate that the machine learning system predicts will optimize an efficiency of an industrial facility, wherein the industrial facility settings slate defines a respective setting for each of a plurality of industrial facility controls;
    determining whether the industrial facility settings defined by the industrial facility setting slate can safely be adopted by the industrial facility; and
    in response to determining that the industrial facility settings defined by the industrial facility setting slate can safely be adopted, adopting the industrial facility settings defined by the industrial facility setting slate.

The second embodiment may also be expressed as a computer program product (e.g., one or more non-transitory computer-readable storage mediums) comprising instructions (e.g., stored on the mediums) that are executable by a processing device and upon such execution cause the processing device to perform operations of:
  receiving, from a machine learning system, an industrial facility setting slate that the machine learning system predicts will optimize an efficiency of an industrial facility, wherein the industrial facility settings slate defines a respective setting for each of a plurality of industrial facility controls;
  determining whether the industrial facility settings defined by the industrial facility setting slate can safely be adopted by the industrial facility; and
  in response to determining that the industrial facility settings defined by the industrial facility setting slate can safely be adopted, adopting the industrial facility settings defined by the industrial facility setting slate.

The second embodiment may also be expressed as a device for controlling physical infrastructure in an industrial facility, the device comprising:
  a controller that performs the respective operations of:
    receiving, from a machine learning system, an industrial facility setting slate that the machine learning system predicts will optimize an efficiency of an industrial facility, wherein the industrial facility settings slate defines a respective setting for each of a plurality of industrial facility controls;
    determining whether the industrial facility settings defined by the industrial facility setting slate can safely be adopted by the industrial facility; and
    in response to determining that the industrial facility settings defined by the industrial facility setting slate can safely be adopted, adopting the industrial facility settings defined by the industrial facility setting slate.

A third embodiment may be a system comprising: a machine learning system that receives state data characterizing a state of an industrial facility and predicts an industrial facility setting slate, which will optimize an efficiency of the industrial facility, wherein the industrial facility setting slate defines a respective setting for each of a plurality of industrial facility controls; a controller that determines whether the industrial facility settings defined by the industrial facility setting slate can be adopted by the industrial facility; and in response to determining that the industrial facility settings defined by the industrial facility setting slate can safely be adopted, adopts the industrial facility settings defined by the industrial facility setting slate; and a proxy that facilitates (e.g., makes possible) a communication path between the machine learning system and the controller.

The proxy may comprise physical components (e.g., a physical interface to a communications network) and/or a communication protocol. In some implementations, the proxy is part of the system. In other implementations, the proxy communicates with the system.

In response to determining that the industrial facility settings cannot safely be adopted by the industrial facility, settings provided by a default control system may be adopted for the industrial facility.

The default control system may be a rule-based control system. Determining whether the industrial facility settings defined by the industrial facility setting slate can safely be adopted may include determining whether each of the industrial facility settings defined by the industrial facility setting slate falls within an acceptable range or rate of change of the setting.

Determining whether the industrial facility settings defined by the industrial facility setting slate can safely be adopted may include determining whether predictions received from the machine learning system have become unstable or wrong.

Determining whether predictions received from the machine learning system have become unstable or wrong may include determining, for each of the industrial facility controls, whether a rate of change of recently predicted settings for the control has satisfied a threshold. The term "recently predicted" may refer to settings which were generated less than a certain (e.g., pre-defined) period before the determination is made.

Determining whether predictions received from the machine learning system have become unstable or wrong may include determining, for each of the industrial facility controls, whether a variance of recently predicted settings for the industrial facility control has satisfied a threshold.

Determining whether predictions received from the machine learning system have become unstable or wrong may include determining that the predictions are simply incorrect, leading to inefficient or erroneous operation of the industrial facility.

Prior to adopting the industrial facility settings, state data characterizing the current state of the industrial facility may be received. A determination may be made to determine, using the state data, whether the industrial facility settings defined by the industrial facility setting slate can safely be adopted. The determination may include determining whether the current state of the industrial facility is suitable for adopting the industrial facility settings.

Determining whether the current state of the industrial facility is suitable for adopting the industrial facility settings may include determining whether any sensor readings identified in the state data fall outside of an (e.g., pre-determined) acceptable range for the sensor.

A determination may be made that no communications have been received from the machine learning system for more than a threshold amount of time and in response, the industrial facility may be controlled using the default control system for the industrial facility.

State data characterizing an updated state of the industrial facility may be sent to the machine learning system after the industrial facility settings have been adopted for use in generating a new predicted data setting slate.

The machine learning system may include a machine learning model that is a neural network. The machine learning model may be a deep neural network. The neural network may be trained using reinforcement learning based on measured or calculated efficiency of the industrial facility.

The subject matter described in this specification can be implemented in particular embodiments so as to realize one or more of the following advantages.

A machine learning system may be able to automatically select process control set points for optimizing a desired objective function within an industrial facility. For example, in a data center, setting values may be selected to optimize power or other resource (e.g., water in the system) usage efficiency, machine health, and central processing unit utilization. For a power plant, setting values may be selected to optimize total power output and heat rate. For a manufacturing facility, setting values may be selected to optimize throughput, yield, and product quality.

Although the present specification gives examples in the context of data centers, the described techniques are equally applicable for any type of industrial facility, e.g., data centers, power plants, and manufacturing facilities. Thus, the described techniques can be used to improve the operation of industrial facilities generally.

Using a machine learning model that predicts safe, advantageous settings, the system may choose the settings without requiring user input or extensive testing. The system may continually optimize efficiency over time as the operating state or configuration of the industrial facility and its operating conditions change.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The specification generally describes a control system, integrated with a machine learning system, that provides direct control over industrial facility infrastructure to improve industrial facility efficiency. For example, a machine learning system may choose setting values for resources in the industrial facility that optimize any one or more of power usage efficiency, machine health, central processing unit utilization, and thermal margin, among other things. The setting values may optimize the efficiency of all of the facility or of only of designated portion of the facility, e.g., of a subset of the machinery in the facility.

In an industrial facility, many possible combinations of hardware, e.g., mechanical and electrical equipment, and software, e.g., control strategies and set points, contribute to industrial facility efficiency. For example, one of the primary sources of energy use in the industrial facility environment is cooling. Industrial facilities generate heat that must be removed to keep the servers running. Cooling is typically accomplished by large industrial equipment such as pumps, chillers, and cooling towers.

However, a simple change to a cold aisle temperature set point will produce load variations in the cooling infrastructures of the industrial facility, e.g., chillers, cooling towers, heat exchangers, and pumps. These load variations cause nonlinear changes in equipment efficiency. The number of possible operating configurations and various feedback loops among industrial facility equipment, equipment operation, and the industrial facility environment make it difficult to optimize energy efficiency. Testing each and every feature combination to maximize industrial facility efficiency is unfeasible given time constraints, frequent fluctuations in industrial facility sensor information and weather conditions, and the need to maintain a stable industrial facility environment. Traditional engineering formulas for predictive modeling often produce large errors because they fail to capture the complex interdependencies of systems in the industrial facility.

A machine learning system receives state data characterizing the current state of an industrial facility and provides updated industrial facility settings to a control system that manages the settings of the industrial facility. The machine learning system can be, for example, a machine learning system such as the one described in U.S. patent application Ser. No. 15/410,547 entitled OPTIMIZING DATA CENTER CONTROLS USING NEURAL NETWORKS, which was filed Jan. 19, 2017, the entire contents of which are hereby incorporated by reference herein.

Figure 1:
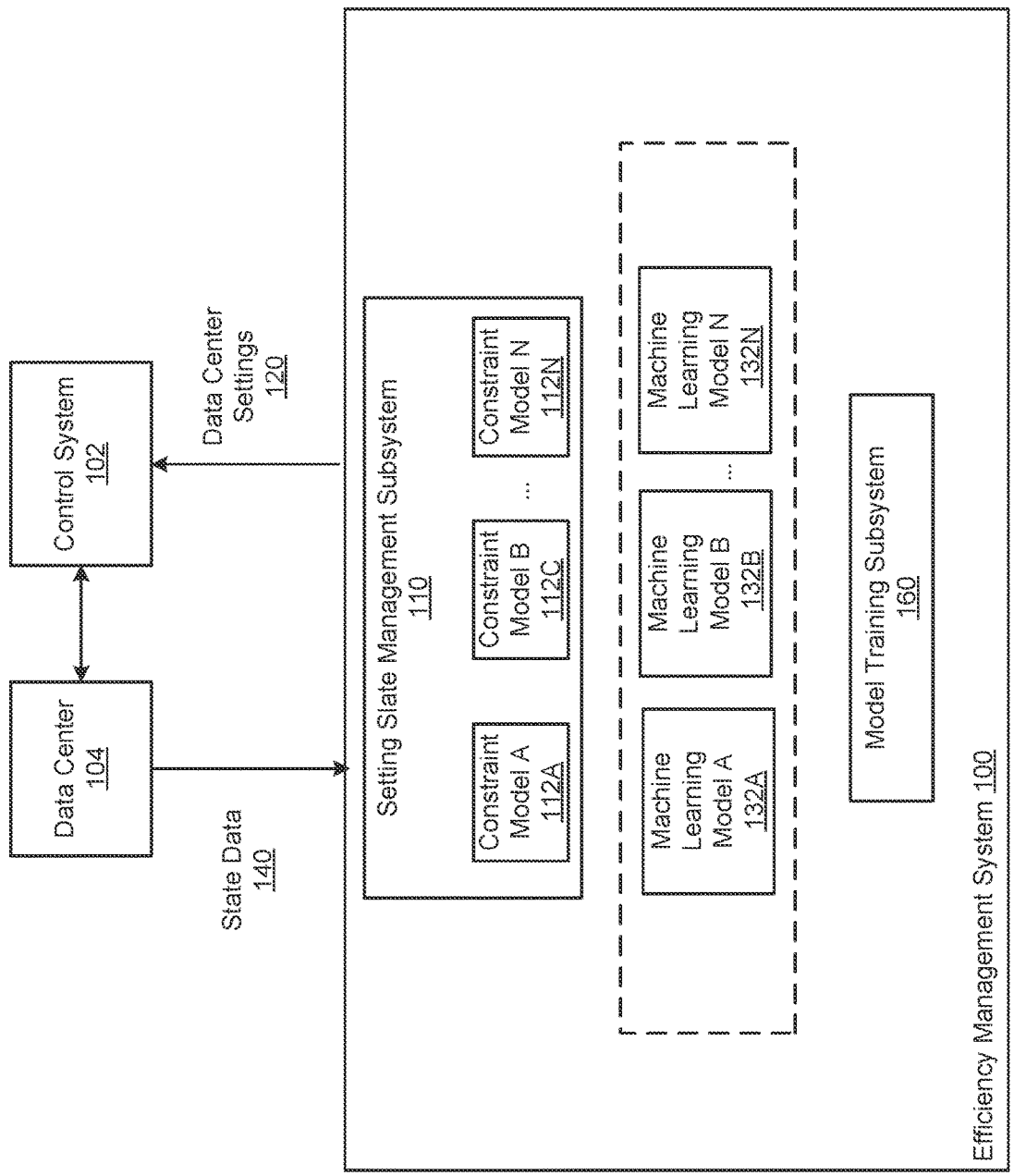
FIG. 1 shows an example efficiency management system.

FIG. 1 shows an example efficiency management system 100. The efficiency management system 100 is an example of a system implemented as computer programs on one or more computers in one or more locations, in which the systems, components, and techniques described below can be implemented.

The efficiency management system 100 receives state data 140 characterizing the current state of a data center (or other industrial facility) 104 and provides updated settings 120 to a control system 102 that manages the settings of the data center 104.

The efficiency management system 100 can take in, as input, state data 140 representing the current state of the data center (or other industrial facility) 104. This state data can come from sensor readings of sensors in the data center 104 and operating scenarios within the data center 104. The state data may include data such as any one or more of temperatures, power, pump speeds, and set points.

The efficiency management system 100 uses this data to determine data center settings 120 that should be changed in the data center 104 in order to make the data center 104 more efficient.

Once the efficiency management system 100 determines the data center settings 120 that will make the data center 104 more efficient, the efficiency management system 100 provides the updated data center settings 120 to the control system 102. The control system 102 uses the updated data center settings 120 to set one or more data center values (control values) for controlling the data center. For example, if the efficiency management system 100 determines that an additional cooling tower should be turned on in the data center 104, the efficiency management system 100 can either provide the updated data center settings 120 to a user who updates the settings or to the control system 102, which automatically adopts the settings without user interaction. The control system 102 can send the signal to the data center to increase the number of cooling towers that are powered on and functioning in the data center 104.

The efficiency management system 100 can train an ensemble of machine learning models 132A-132N using a model training subsystem 160 to predict the resource efficiency of the data center 104 if particular data center settings are adopted. In some cases, the efficiency management system 100 can train a single machine learning model to predict the resource efficiency of the data center if particular data center settings are adopted.

In particular, each machine learning model 132A-132N in the ensemble is configured through training to receive a state input characterizing the current state of the data center 104 and a data center setting slate that defines a combination of possible data center settings and to process the state input and the data center setting slate to generate an efficiency score that characterizes a predicted resource efficiency of the data center if the data center settings defined by the data center setting slate are adopted.

In some implementations, the efficiency score represents a predicted power usage effectiveness (PUE) of the data center if the settings of a particular slate are adopted by the data center 104. PUE is defined as the ratio of the total building energy usage to the information technology energy usage.

In some implementations, the efficiency score represents a predicted water usage of the data center if the settings of a particular slate are adopted by the data center 104. In other implementations, the efficiency score represents a predicted monetary amount spent on electricity. In other implementations, the efficiency score represents a predicted load amount that can be achieved by a datacenter.

In some implementations, each machine learning model (132A-132N) is a neural network, e.g., a deep neural network, that the efficiency management system 100 can train to produce an efficiency score.

Neural networks are machine learning models that employ one or more layers of models to generate an output, e.g., one or more classifications, for a received input. Deep neural networks include one or more hidden layers in addition to an output layer. The output of each hidden layer is used as input to the next layer in the network, i.e., the next hidden layer or the output layer. Each layer of the neural network generates an output from a received input in accordance with current values of a respective set of parameters for the layer.

The model training subsystem 160 uses historical data from a data center 104 to create different datasets of sensor data from the data center. Each machine learning model 132A-132N in the ensemble of machine learning models can be trained on one dataset of historical sensor data.

The efficiency management system 100 can train additional ensembles of constraint machine learning models 112A-112N using the model training subsystem 160 to predict an operating property of the data center that corresponds to an operating constraint if the data center 104 adopts certain data center settings 102.

If the efficiency management system 100 determines that a constraint model predicts that the value of a given data center setting will violate a constraint of the data center, the efficiency management system will discard the violating setting.

Each constraint model 112A-112N is a machine learning model, e.g., a deep neural network, that is trained to predict certain values of an operating property of the data center over a period of time if the data center adopts a given input setting. For example, the model training subsystem 160 can train one constraint model to predict the future water temperature of the data center over the next hour given input state data 140 and potential settings. The model training subsystem 120 can train another constraint model to predict the water pressure over the next hour given the state data 140 and potential settings.

A setting slate management subsystem 110 within the efficiency management system 100 preprocesses the state data 140 and constructs a set of setting slates that represent one or more (typically a plurality of) data center setting values that can be set for various parts of the data center given the known operating conditions and the current state of the data center 104. Each setting slate defines a respective combination of possible data center settings that affect the efficiency of the data center 104.

For example, the efficiency management system 100 may determine the most resource efficient settings for a cooling system of the data center 104. The cooling system may have the following architecture: (1) servers heat up the air on the server floor; (2) the air is cycled and the heat is transferred to the process water system; (3) the process water system is cycled and connects to the condenser water system using a heat sync; and (4) the condenser water system takes the heat from the process water system and transfers it to the outside air using cooling towers or large fans.

To efficiently control the cooling system, the efficiency management system 100 may construct different potential setting slates that include various temperatures for the cooling tower set points, cooling tower bypass valve positions, cooling unit condenser water pump speeds, a number of cooling units running, and/or process water differential pressure set points. As an example, one setting slate may include the following values: 68 degrees as the temperature for the cooling tower set points, 27 degrees as the cooling tower bypass valve position, 500 rpm as the cooing unit condenser water pump speed, and 10 as the number of cooling units running.

Other examples of slate settings that impact efficiency of the data center 104 include: potential power usage across various parts of the data center; certain temperature settings across the data center; a given water pressure; specific fan or pump speeds; and a number and type of the running data center equipment such as cooling towers and water pumps.

During preprocessing, the setting slate management subsystem 110 can modify the state data 140. For example, it may remove data within invalid power usage efficiency, replace missing data for a given data setting with a mean value for that data setting, and/or remove a percentage of data settings. The setting slate management system 110 discretizes all of the action dimensions and generates an exhaustive set of possible action combinations. For any continuous action dimensions, the system converts the action into a discrete set of possible values. For example, if one of the action dimensions is a valve that has a value from 0.0 to 1.0, the system may discretize the values into the set [0.0, 0.05, 0.1, 0.15, . . . , 1.0]. The system may discretize for every dimension, and the full action set is every possible combination of the values. The system then removes all actions that violate the constraint models.

The setting slate management subsystem 110 sends the constructed set of setting slates and the current state of the data center 104 to the constraint model 112A-112N. The setting slate management subsystem then determines whether certain data center setting slates, if chosen by the system, are predicted to result in violations of operating constraints for the data center. The setting slate management subsystem 100 removes any data center setting slates from the set of setting slates that are predicted to violate the constraints of the data center.

The efficiency management system 100 sends the updated set of setting slates and the state data 140 to the ensemble of machine learning models 132A-132N that use the state data and the setting slates to generate efficiency scores as output.

Since each machine learning model in the ensemble of models 132A-132N is trained on a different dataset than the other models, each model has the potential to provide a different predicted PUE output when all the machine learning models in the ensemble are run with the same data center setting values as input. Additionally or alternatively each machine learning model may have a different architecture which could also cause each model to potentially provide a different predicted PUE output.

The efficiency management system 100 can choose data center setting values that focus on long-term efficiency of the data center. For example, some data center setting values provide long-term power usage efficiency for the data center, e.g., ensuring that the power usage in the data center is efficient for a long predetermined time after the data center was in the state characterized by the state input. Long-term power usage efficiency may be for time durations of at least ten minutes, such as thirty minutes, one hour, or longer from the time the data center was in the input state, whereas short term power usage efficiency focuses on a short time (e.g., less than ten minutes) after the data center was in the input state, e.g., immediately after five seconds after, the data center was in the input state.

The system can optimize the machine learning models for long term efficiency so that the models can make predictions based on the dynamics of the data center and are less likely to provide recommendations for slate settings that yield good results in the short term, but are bad for efficiency over the long term. For example, the system can predict PUE over the next day, assuming that optimal actions will continue to be taken every hour. The system can then take actions that it knows will lead to the best PUE over the whole data, even if the PUE for a given hour is worse than the previous hour.

The efficiency management system 100 determines the final efficiency score for a given setting slate based on the efficiency scores of each machine learning model in the ensemble of models for a given setting slate to produce one overall efficiency score per setting slate.

The efficiency management system 100 then either recommends or selects new values for the data center settings based on the efficiency scores assigned to each slate from the machine learning models 132A-132N. The efficiency management system can send the recommendations to a data center operator to be implemented, e.g., by being presented to the data center operator on a user computer, or set automatically without needing to be sent to a data center operator.

In some implementations, the machine learning system may be a cloud-based artificial intelligence system. There may be a proxy between the machine learning system and the control system that allows the control system to communicate with the cloud-based AI, e.g., over a telecommunication system. The proxy sends the recommended industrial facility settings from the machine learning system to the control system. The proxy can use a communication protocol, such as Modbus, to facilitate communication.

In certain situations, using the predictions generated by the machine learning system of FIG. 1 may result in instability or hazardous conditions in the data center. In these situations, a control system should be used to determine safe settings that can be adopted by the data center or industrial facility without causing the data center or industrial facility environment to become dangerous or unstable.

Figure 2:
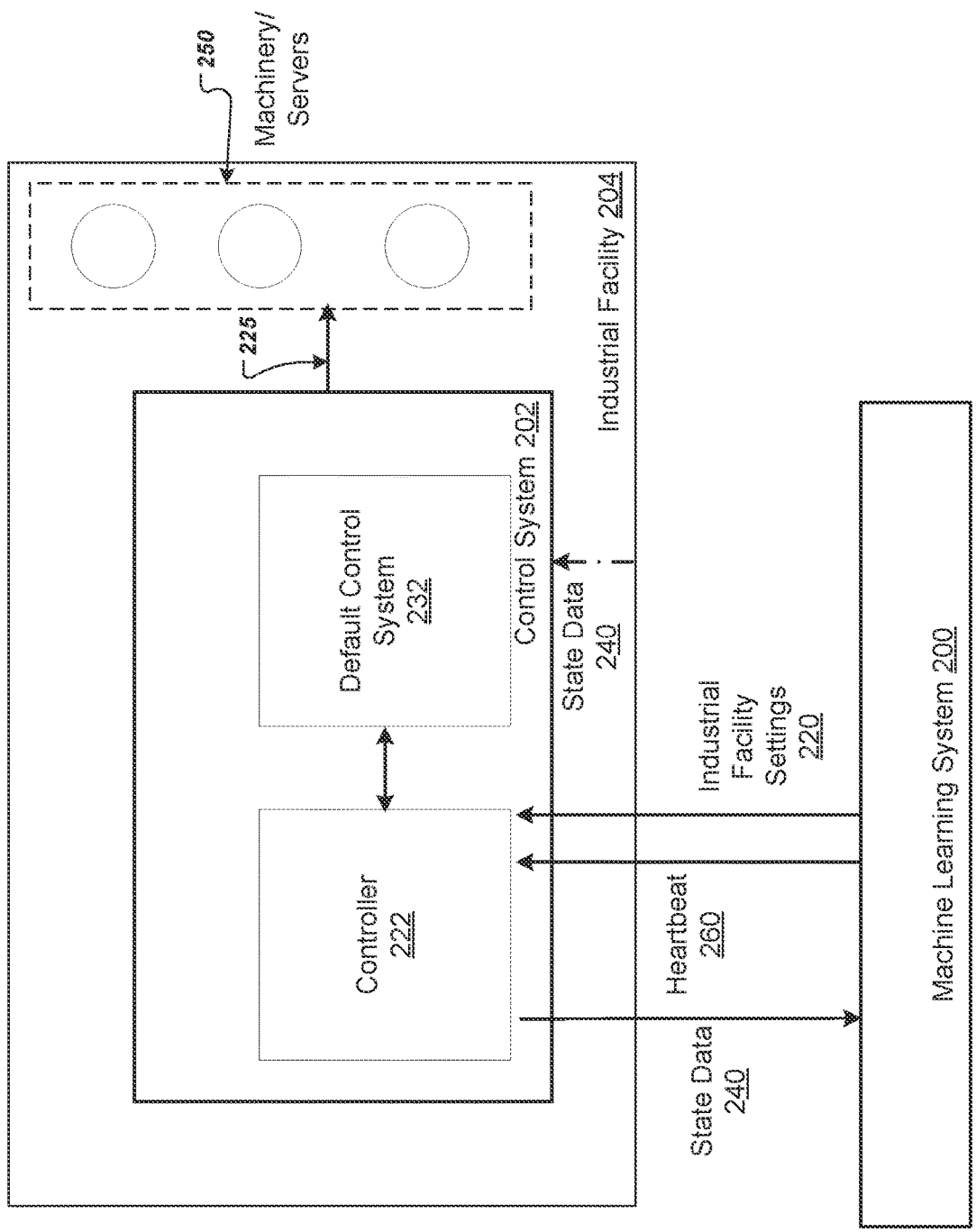
FIG. 2 is shows an example of a control system with machine learning integration.

FIG. 2 shows an example of such a control system 202. The control system 202 is an example of a system implemented as computer programs on one or more computers in one or more locations, in which the systems, components, and techniques described below can be implemented.

The control system 202 receives state data 240 describing the industrial facility 204. The state data 240 can come from sensor readings of sensors in the industrial facility 204 and operating scenarios within the industrial facility 204. The state data may include data such as temperatures, power, pump speeds, and set points. As illustrated in FIG. 2, the control system is within the industrial facility 204. However, in some implementations the control system can be separate from the industrial facility 204 and communicates with the industrial facility by a proxy or some other communication mechanism.

The control system 202 may send state data 240 to the machine learning system 200. The system 202 receives proposed industrial facility settings 220 and, optionally, a heartbeat signal 260 from a machine learning system 200. The industrial facility settings 220 are settings that the machine learning system 200 determines will make the industrial facility 204 more efficient with respect to one or more metrics that the machine learning system has been trained to optimize. The settings may be in the form of a setting slate that defines a setting value for each of the industrial facility control settings.

For example, the settings may be for a cooling system of the industrial facility 204, as similarly described above. The cooling system may have the following architecture: (1) servers heat up the air on the server floor; (2) the air is cycled and the heat is transferred to the process water system; (3) the process water system is cycled and connects to the condenser water system using a heat sync; and (4) the water condenser water system takes the heat from the process water system and transfers it to the outside air using cooling towers or large fans. Settings can include various temperatures for cooling tower set points, cooling tower bypass valve positions, cooling unit condenser water pump speeds, a number of cooling units running, and/or process water differential pressure set points.

Efficiency may be measured in terms of one of several cost functions including: optimize power or other resource (e.g., water in the system) usage efficiency, machine health, central processing unit utilization, and thermal margin. The heartbeat signal 260 verifies communication between the control system 202 and the real-time data network of the machine learning system 200.

The control system 202 can use the updated industrial facility settings 220 from the machine learning system 200 to set the industrial facility 204 values. For example, if the machine learning system 200 determines that an additional cooling tower should be turned on in the industrial facility 204, the machine learning system 200 can provide the updated industrial facility settings 220 to the control system 202. As illustrated in FIG. 2, the control system 202 communicates directly with the machine learning system 200. However, in some implementations the control system communicates with the machine learning system through a proxy or some other communication mechanism.

The controller 222 of the control system 202 determines whether the settings are safe to automatically adopt without user interaction 202. If the settings are safe to adopt, the control system 202 sets controls of the industrial facility 204 to settings 225 that are the same as the industrial facility settings 220 which the control system 202 received from the machine learning system 200. For example, the controls may be electronically configurable and communicatively coupled to the control system 202, e.g., through a wired or wireless connection. The control system 202 can then send a signal that causes the controls to be set to settings 225 that are the same as the industrial facility settings 220.

In this example, the control system 202 can send the signal to the industrial facility 204 to increase the number of cooling towers that are powered on and functioning in the industrial facility 204 if the control system 202 determines that the settings are safe to adopt.

However, if the controller 222 determines that the settings received from the machine learning system 200 are unsafe to adopt, the control system 202 may hold the industrial facility at the last known good industrial facility settings and begin adopting settings provided by a default control system 232 for the industrial facility 204. The controller then sends the default control system 232 settings to the industrial facility 204 as the industrial facility settings 225.

Figure 3:
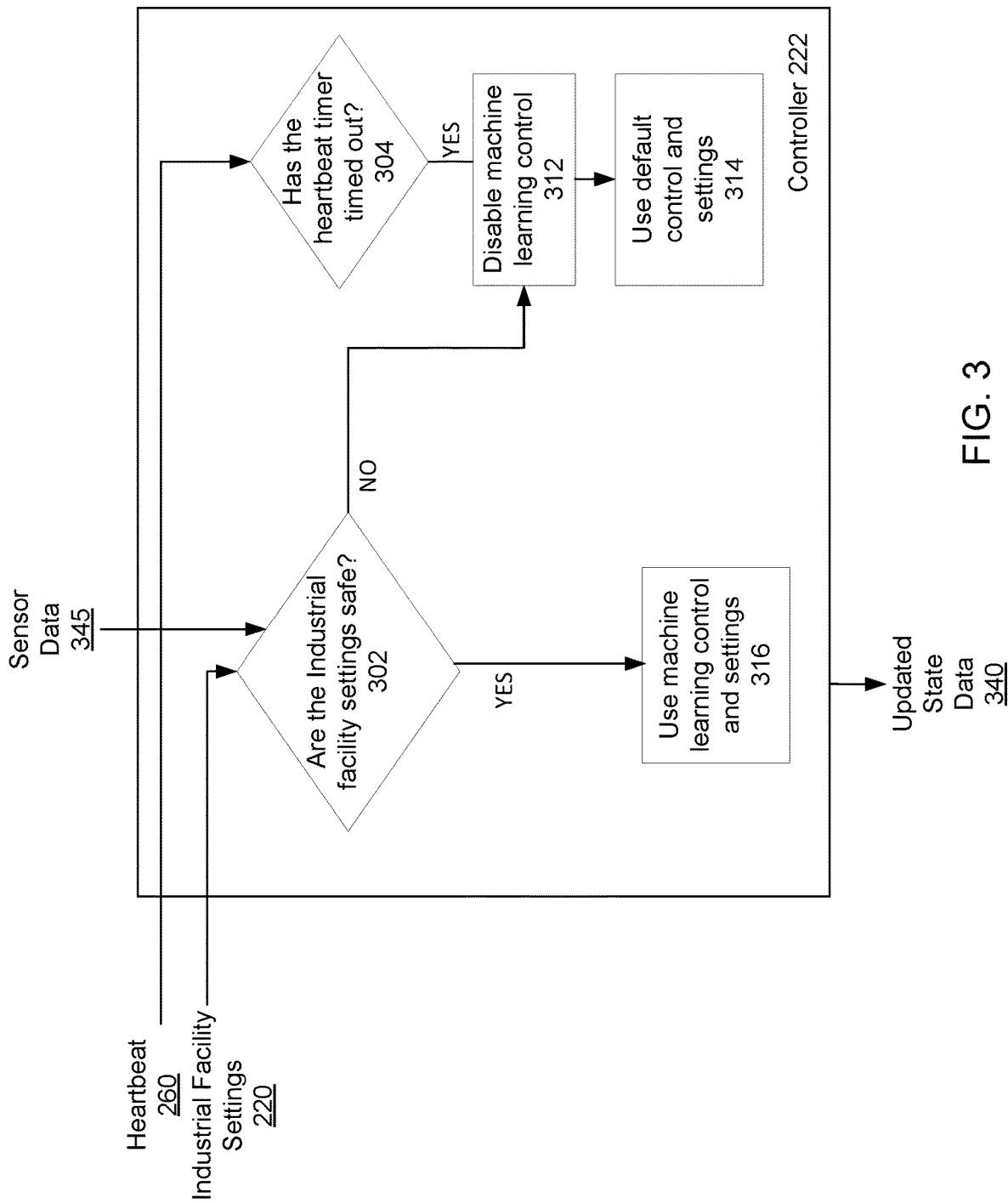
FIG. 3 is a flowchart of an example process for controlling industrial facility settings.

FIG. 3 illustrates an example flow diagram of the determination by the controller 222 regarding whether to use industrial facility settings from the machine learning system 200 or to use default control and settings from a default control system. In some cases, the default control system uses rules and heuristics to set industrial facility values, i.e., the manner in which the default control system selects settings is hard-coded and does not use machine learning.

The controller 222 uses one or more criteria to determine whether to use industrial facility settings from the machine learning system or to use default control and settings. The controller can check to see if a machine learning mode that distinguishes between using machine learning system industrial facility settings and default settings from a default control system has been disabled. The machine learning mode can be disabled by an industrial facility operator manually or by the machine learning system through a mode setting. If the machine learning mode has been disabled, the controller will go into default mode and use the default control system to set the industrial facility settings. The controller will also enter default mode and use default control system settings when there are equipment failures in the industrial facility. If communication is lost between the controller and other controllers or equipment, the controller may also revert to default controls.

When the controller 222 is in machine learning mode, the controller may determine whether the industrial facility settings proposed by the machine learning system are safe to implement in the industrial facility.

As illustrated in FIG. 3, an example controller 222 receives industrial facility settings 220 from the machine learning system and state data that includes sensor data 345 from the industrial facility. The controller 222 can also optionally receive the heartbeat signal 260 from the machine learning system.

The controller 222 determines whether the industrial facility can safely adopt the industrial facility settings proposed by the machine learning system 200. The controller may perform this determination by comparing each setting in the received industrial facility settings with an acceptable value or range of values that has been predefined for the setting. The controller determines whether each setting is an appropriate value or falls within the acceptable range for the setting. If the settings are within the acceptable value or range of values, the controller determines that the industrial facility can safely adopt the settings proposed by the machine learning system. For example, the industrial facility settings proposed by the machine learning system may include a setting indicating that an additional cooling tower should be turned on in the industrial facility. The acceptable number of cooling towers that are on at a given time in the industrial facility may be 10. If 10 are currently on, the setting indicating that an additional cooling tower should be turned on will cause 11 cooling towers to be turned on at a given time in the industrial facility. Since 11 is greater than the defined appropriate value of 10, the controller determines that the industrial facility cannot safely adopt the industrial facility settings.

Additionally or alternatively, in some implementations the industrial facility determines that the industrial facility settings proposed by the machine learning system are safe to adopt by determining whether the predictions received from the machine learning model have become unstable. For example, stability may be determined by a rate of change or variance of a setting value. If an industrial facility setting changes and/or varies by at least a predetermined threshold amount, the setting value is considered unstable. The system computes a rate of change or a variance between the most-recently predicted values for the setting by the machine learning system. If the rate of change or variance exceeds a defined threshold, the system determines that the predictions from the machine learning system for the setting value have become unstable.

When industrial facility settings are determined to be unstable, the controller 222 may hold the industrial facility at the last known good values and transition to the default control system 232 for new industrial facility settings.

The controller 222 can additionally or alternatively receive state data 240 that includes data characterizing the current state of the industrial facility and determine whether the current state of the industrial facility is suitable for adopting the industrial facility settings proposed by the machine learning system. In some cases, the proposed industrial facility settings would be unsafe to implement given the state of the industrial facility. This suitability determination may be made by determining whether any sensor readings identified in the state data fall outside an acceptable value or an acceptable range for the sensor. For example, one of the sensor readings may be the current temperature at some point within the facility. If the current temperature reading exceeds a threshold, the proposed industrial facility is considered to be in an unsafe state for direct control by the machine learning system. Therefore, prior to adopting the industrial facility settings, the controller will hold the industrial facility at the last known good values and transition to the default control system for new industrial facility settings.

The controller 222 can use the optional heartbeat signal 260 to determine whether there is communication between the controller and the machine learning system. If it is determined that no communication has been received by the controller from the machine learning system for more than a predefined threshold amount of time 304, the controller will control the industrial facility using the default control system 232 for the industrial facility 314 and may disable the machine learning control mode 312.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving, from a machine learning system and by a control system for a controllable facility, a first optimal controllable facility setting slate generated by a machine learning system for the controllable facility in a first state at a first time, wherein the first optimal controllable facility setting slate includes first values for setting a plurality of controllable facility controls;
determining, by the control system for the controllable facility, that the first values in the first optimal controllable facility setting slate, once adopted by the controllable facility in the first state, will not result in unstable conditions in the controllable facility;
in response to determining that the first values will not result in unstable conditions in the controllable facility, adopting the first values in the first optimal controllable facility setting slate for controlling the controllable facility;
receiving, from the machine learning system and by the control system for the controllable facility, a second optimal controllable facility setting slate generated by the machine learning system for the controllable facility in a second state at a second time, wherein the second optimal controllable facility setting slate includes second values for setting the plurality of controllable facility controls;
determining, by the control system for the controllable facility, that the second values in the second optimal controllable facility setting slate, once adopted by the controllable facility in the second state, will result in unstable conditions in the controllable facility; and
in response to determining that the second values will result in unstable conditions in the controllable facility, adopting settings provided by a default control system for controlling the controllable facility.

2. The method of claim 1, wherein the first optimal controllable facility setting slate is predicted to optimize the efficiency of the controllable facility over a period of time from the first time.

3. The method of claim 1, wherein the default control system is a rule-based control system.

4. The method of claim 1, wherein determining that the second values in the second optimal controllable facility setting slate will result in unstable conditions comprises:
determining whether each of the second values falls within an acceptable range.

5. The method of claim 1, wherein determining that the second values in the second optimal controllable facility setting slate will result in unstable conditions further comprises:
determining whether predictions received from the machine learning system have become unstable.

6. The method of claim 5, wherein determining whether predictions received from the machine learning system have become unstable comprises:
determining, for each of the controllable facility controls, whether a rate of change of recently predicted settings for the controllable facility control has satisfied a threshold.

7. The method of claim 5, wherein determining whether predictions received from the machine learning system have become unstable comprises:
determining, for each of the controllable facility controls, whether a variance of recently predicted settings for the controllable facility control has satisfied a threshold.

8. The method of claim 1, wherein determining that the second values will result in unstable conditions comprises:
determining whether the second state of the controllable facility is suitable for adopting the second values.

9. The method of claim 8, wherein determining whether the second state of the controllable facility is suitable for adopting the second values comprises determining whether any sensor readings by a sensor fall outside of an acceptable range for the sensor.

10. The method of claim 1, further comprising:
determining that no communications have been received from the machine learning system for more than a threshold amount of time; and
in response, controlling the controllable facility using a default control system for the controllable facility.

11. The method of claim 1, further comprising:
sending state data characterizing an updated state of the controllable facility to the machine learning system after the first values have been adopted for use in generating a new predicted data setting slate.

12. The method of claim 1, wherein the machine learning system includes a machine learning model that is a neural network.

13. The method of claim 12, wherein the machine learning model is a deep neural network.

14. The method of claim 12, wherein the neural network has been trained using reinforcement learning based on measured or calculated efficiency of the controllable facility.

15. A system comprising:
one or more computers; and
one or more storage devices storing instructions that are operable, when executed on one or more computers, to cause the one or more computers to perform operations comprising:
receiving, from a machine learning system and by a control system for a controllable facility, a first optimal controllable facility setting slate generated by a machine learning system for the controllable facility in a first state at a first time, wherein the first optimal controllable facility setting slate includes first values for setting a plurality of controllable facility controls;
determining, by the control system for the controllable facility, that the first values in the first optimal controllable facility setting slate, once adopted by the controllable facility in the first state, will not result in unstable conditions in the controllable facility;
in response to determining that the first values will not result in unstable conditions in the controllable facility, adopting the first values in the first optimal controllable facility setting slate for controlling the controllable facility;
receiving, from the machine learning system and by the control system for the controllable facility, a second optimal controllable facility setting slate generated by the machine learning system for the controllable facility in a second state at a second time, wherein the second optimal controllable facility setting slate includes second values for setting the plurality of controllable facility controls;
determining, by the control system for the controllable facility, that the second values in the second optimal controllable facility setting slate, once adopted by the controllable facility in the second state, will result in unstable conditions in the controllable facility; and
in response to determining that the second values will result in unstable conditions in the controllable facility, adopting settings provided by a default control system for controlling the controllable facility.

16. The system of claim 15, wherein the first optimal controllable facility setting slate is predicted to optimize the efficiency of the controllable facility over a period of time from the first time.

17. The system of claim 15, wherein determining that the second values in the second optimal controllable facility setting slate will result in unstable conditions further comprises:
determining whether predictions received from the machine learning system have become unstable.

18. A computer program product comprising instructions that are executable by a processing device and upon such execution cause the processing device to perform operations of:
receiving, from a machine learning system and by a control system for a controllable facility, a first optimal controllable facility setting slate generated by a machine learning system for the controllable facility in a first state at a first time, wherein the first optimal controllable facility setting slate includes first values for setting a plurality of controllable facility controls;
determining, by the control system for the controllable facility, that the first values in the first optimal controllable facility setting slate, once adopted by the controllable facility in the first state, will not result in unstable conditions in the controllable facility;
in response to determining that the first values will not result in unstable conditions in the controllable facility, adopting the first values in the first optimal controllable facility setting slate for controlling the controllable facility;
receiving, from the machine learning system and by the control system for the controllable facility, a second optimal controllable facility setting slate generated by the machine learning system for the controllable facility in a second state at a second time, wherein the second optimal controllable facility setting slate includes second values for setting the plurality of controllable facility controls;
determining, by the control system for the controllable facility, that the second values in the second optimal controllable facility setting slate, once adopted by the controllable facility in the second state, will result in unstable conditions in the controllable facility; and
in response to determining that the second values will result in unstable conditions in the controllable facility, adopting settings provided by a default control system for controlling the controllable facility.

19. The computer program product of claim 18, wherein the first optimal controllable facility setting slate is predicted to optimize the efficiency of the controllable facility over a period of time from the first time.

20. The computer program product of claim 18, wherein determining that the second values in the second optimal controllable facility setting slate will result in unstable conditions further comprises:
determining whether predictions received from the machine learning system have become unstable.

* * * * *